United States Patent [19]

Kelley

[11] 4,059,665

[45] Nov. 22, 1977

[54] BONDED NON-WOVEN FABRIC AND METHOD FOR MAKING IT

[75] Inventor: Louis E. Kelley, Philadelphia, Pa.

[73] Assignee: Rohm and Haas Company, Philadelphia, Pa.

[21] Appl. No.: 360,285

[22] Filed: May 14, 1973

Related U.S. Application Data

[63] Continuation-in-part of Ser. No. 36,499, May 11, 1970, abandoned.

[51] Int. Cl.$^2$ .............................................. D04H 1/64
[52] U.S. Cl. ........................... 264/128; 260/29.6 TA; 526/304; 428/290; 526/16; 526/55
[58] Field of Search .................. 264/128; 260/86.1 N, 260/29.6 TA; 161/170; 526/304, 16, 55; 428/290

[56] References Cited

U.S. PATENT DOCUMENTS

| | | | |
|---|---|---|---|
| 3,157,562 | 11/1964 | Kine et al. | 161/249 |
| 3,445,403 | 5/1969 | Tucker et al. | 260/86.1 N |

*Primary Examiner*—Robert F. White
*Assistant Examiner*—James R. Hall
*Attorney, Agent, or Firm*—Terence P. Strobaugh; George W. F. Simmons

[57] ABSTRACT

Fibers in non-woven fibrous products are bonded together by a binder comprising a heat-cured product of a water insoluble copolymer of (i) an N-methylolamide which is N-methylolacrylamide or N-methylolmethacrylamide, and (ii) an acrylic acid ester of acrylic acid or methacrylic acid and a $C_1$ to $C_8$ alkanol, modified with (iii) a polyalkylene glycol of the formula $$HO-(RO)_n-H$$

wherein R is an alkylene group of 2 to 6 carbon atoms and $n$ is a number having an average value of 4 to 50. Preferred acrylic acid esters are ethyl acrylate and butyl acrylate, and the preferred polyalkylene glycol is a polyethylene glycol characterized by a molecular weight in the range of 300 to 2000. The copolymer may also contain units derived from unsaturated aliphatic carboxylic acids. Preferably the copolymer contains units derived from itaconic acid. The itaconic acid stabilizes aqueous dispersions of the copolymer and adds stiffness to the treated fibrous products without detracting from resilience and solvent resistance.

2 Claims, No Drawings

BONDED NON-WOVEN FABRIC AND METHOD FOR MAKING IT

This application is a continuation-in-part of my co-pending United States patent application Ser. No. 36,499, filed May 11, 1970 now abandoned.

The present invention relates to processes for bonding fibers of non-woven fabrics. The non-woven fabrics are fibrous or filamentous products having a carded fiber structure or comprising fibrous mats in which the fibers or filaments are distributed haphazardly or in random array. The expression "random array" is intended herein to include the array of fibers in a carded web wherein partial orientation is frequently present as well as other arrays in which the fibers are in a completely haphazard distributional relationship.

The bonded non-woven fibrous products of this invention are useful in the production of articles of either flat or three-dimensional shape, including insulating material and the like. Particularly the bonded fibrous products are used as textile products in articles of dress, for example, as interliners for the collars and cuffs of shirts, especially the relatively open-weave type used for summer wear.

Bonded fibrous products suitable for such uses must be resilient with crush resistance and shape retention; they must have a soft, but firm, feel or "hand"; and they must be of sufficient solvent resistance to withstand drycleaning operations. Upon drycleaning, some products of the type heretofore produced lose their soft hand and draping qualities and may show discoloration (yellowing) and loss of strength upon bleaching.

The compositions used for bonding non-woven fabrics in accordance with the present invention comprise the heatcured product of a mixture of a copolymer of an N-methylolamide and an acrylic acid ester and a polyalkylene glycol. The resulting non-woven fabrics have excellent resilience, are of a soft, but firm "hand" and exhibit excellent solvent-resistant properties. In its broadest description, the present invention is a non-woven fibrous product resistant to drycleaning and laundering, the fibers in the product being bonded together by a binder comprising a heat-cured product of a mixture of (1) a water-insoluble copolymer of (i) an N-methylolamide which is N-methylolacrylamide or N-methylolmethacrylamide, and (ii) an acrylic acid ester of acrylic acid or methacrylic acid and (2) a ($C_1$ to $C_{18}$)alkanol, modified with (iii) a polyalkylene glycol of the formula

$$HO-(RO)_n-H$$

wherein R is an alkylene group of 2 to 6 carbon atoms and n is a number having an average value of 4 to 50. The copolymer may contain units derived from an unsaturated ($C_3$ to $C_6$)aliphatic carboxylic acid. Preferably the copolymer contains units derived from itaconic acid. The process of the present invention is a process of making a non-woven fabric which comprises associating in random array, within a web or mat, a mass of fibers, bringing into contact with the fibers a binder comprising an aqueous dispersion containing dispersed therein a water-insoluble copolymer and glycol described above, drying the resulting fibrous mass to effect fusion of the polymer and bonding of the fibers, and then curing the fabric by heating the fibrous product at a temperature of 210° F. to 750° F. to produce a soft, resilient non-woven fibrous product of excellent solvent-resistant properties.

Kine et al., United States Pat. No. 3,157,562, issued Nov. 17, 1964, discloses non-woven fibrous products bonded by the heat-cured product of a water-insoluble linear copolymer of an N-methylolamide, an amide group-containing monomer, and an acrylic acid ester, among others. Specifically disclosed N-methylolamides include N-methylolacrylamide and N-methylolmethacrylamide; specifically disclosed amide group-containing monomers include acrylamide and methacrylamide, and specifically disclosed esters include ethyl acrylate and butyl acrylate. All of the disclosed compositions contain the amide group-containing component and none of the compositions contains a polyalkylene glycol component.

British patent specification No. 1,100,240 relates to a process for bonding fleeces with an aqueous dispersion which contains (a) a polymer or copolymer prepared from a vinyl or divinyl monomer and containing groups capable of reacting with isocyanate groups and (b) an isocyanate group-containing reaction product of a compound carrying at least 2 hydroxyl groups and a stoichiometric excess of a polyisocyanate. For example, the British patent teaches bonding compositions which are aqueous dispersions of butadiene-butyl acrylate-isocyanate/polyethylene glycol copolymers.

In accordance with the present invention, it has been found that particular copolymers of N-methylolamides and acrylic acid esters modified with polyalkylene glycols when applied to non-woven fabrics and cured by heating at elevated temperatures, impart resilience, soft hand, resistance to laundering operations such as may be performed with modern detergents, as well as resistance to drycleaning by chlorinated hydrocarbons, such as carbon tetrachloride. The copolymers of the present invention are water-insoluble copolymers obtained by emulsion copolymerization of a mixture of copolymerizable monoethylenically unsaturated molecules comprising (i) 1 to 8% by weight of N-methylolacrylamide or N-methylolmethacrylamide, and (ii) 92 to 99% by weight of an acrylic acid ester of acrylic acid or methacrylic acid and a ($C_1$ to $C_{18}$)alkanol, modified with (iii) 0.5 to 10.0% by weight of a polyalkylene glycol of the formula

$$HO-(RO)_n-H$$

wherein R is an alkylene group of 2 to 6 carbon atoms and n is a number having an average value of 4 to 50. Preferably, the compositions comprise 3 to 4.5 weight percent of the N-methylolamide and 95.5 to 97 weight percent of acrylic acid ester modified by admixture with 2 to 5 weight percent polyalkylene glycol. These weight percents are optimum amounts and result in compositions which impart the most desired properties to non-woven fibrous products. The components however may be used in percentages outside of the ranges given.

As pointed out above, the mixture of copolymerizable monoethylenically unsaturated molecules may include an unsaturated ($C_3$ to $C_6$)aliphatic carboxylic acid. Preferably the unsaturated aliphatic carboxylic acid is itaconic acid. The unsaturated aliphatic carboxylic acid, particularly itaconic acid, stabilizes aqueous dispersions of the copolymer and adds stiffness to the treated fibrous products without detracting from resilience and solvent-resistance. The acid is preferably present in quantities by weight of 0.5 to 5.0% based on the total weight of the copolymer. Examples of suitable acids other than itaconic acid include acrylic acid, methacrylic acid, citraconic acid, etc.

Examples of the acrylic acid esters (ii) include methyl methacrylate, ethyl methacrylate, propyl methacrylate, butyl methacrylate, octyl methacrylate, octadecyl methacrylate, methyl acrylate, ethyl acrylate, butyl acrylate, octyl acrylate and octadecyl acrylate.

Fabric webs bonded with the ethyl acrylate-containing copolymers of the present invention exhibit excellent resilience and solvent-resistance. Fibrous products bonded with the butyl acrylate-containing copolymers of the present invention show excellent resilience but somewhat less solvent-resistance than the ethyl acrylate copolymer bonded webs. For this reason the ethyl acrylate copolymers are a preferred embodiment of the present invention. However, even better results are obtainable when both ethyl acrylate and butyl acrylate are in the copolymer. An example of this is a copolymer of 48% by weight of butyl acrylate, 48% of ethyl acrylate, about 0.5 to 2% of itaconic acid, and about 2 to 3.5% by weight of a mixture of approximately equimolar amounts of acrylamide and N-methylolacrylamide.

Examples of suitable polyalkylene glycols include polyethylene glycols, polypropylene glycols, polybutylene glycols and polyhexylene glycols. Polyalkylene glycols with a molecular weight 194 to 4000 are suitable in the present invention while polyalkylene glycols with a molecular weight in the range of 300 to 2000 are preferred. Polyethylene glycols within these molecular weight ranges are the most preferred polyalkylene glycols.

It should be noted that the copolymer in the aqueous dispersion of the present invention must be obtained by emulsion copolymerization of a mixture of the copolymerizable molecules described above for satisfactory results. Omission of any one of the groups of copolymerizable molecules or substitution for any one of the groups will produce a copolymer which is not completely satisfactory as the copolymers of the present invention for bonding non-woven fibers. It has surprisingly been found that omission of the polyalkylene glycol modifier results in bonding compositions which produce non-woven fibrous products characterized by poor resilience, stiffness and solvent resistance. It appears that in the absence of the polyalkylene glycol modifier, the N-methylolamideacrylic acid ester copolymer migrates toward the surface of the fabric after removal from the padding bath or application dispersion thereby resulting in non-uniform application of the binder to the fibrous webs. The present invention therefore resides in the cooperative and interdependent manner in which the components are combined to produce bonding compositions which impart resilience and solvent-resistance to fibrous products.

The copolymers of the present invention may be produced by conventional emulsion polymerization procedures employing a suitable emulsifier or mixtures of a non-ionic with a cationic or an anionic emulsifier in conjunction with a free-radical initiator which may be a component of any of the well-known redox systems. Examples of emulsifiers that may be used include sodium lauryl sulfate, t-octylphenoxypolyethoxyethanols containing about 10 to 50 oxyethylene units per molecule and lauryl pyridinium chloride. The amount of emulsifier may range from about 0.5 to 7.5% on the weight of monomers. Any free-radical initiator such as azodiisobutyronitrile, t-butyl hydroperoxide, and ammonium or potassium persulfates may be employed. The initiator may be present in amount from 0.1 to 2.0% on the weight of monomers, the amount preferably being sufficient to provide molecular weights of about a million or higher in the particles of the emulsion polymer produced.

The polymers used as binders of the present invention may also be graft or block copolymers wherein one or more, but not all, of the monomers are copolymerized within the first polymer obtained. Thus, the acrylic acid ester or the N-methylolamide may first be homopolymerized or copolymerized with one or more, but less than all, of the comonomers to be introduced into the ultimate copolymer, and then the last monomer or monomers can be added to the system and copolymerized or grafted on to the first homopolymer or copolymer formed. The same procedure may be used in reverse order to graft the acrylic acid ester or N-methylolamide on to a previously-formed homopolymer or copolymer of other monomeric units. Again, a plurality of monomeric units may be introduced in succession and the acrylic acid ester of N-methylolamide may be introduced at the beginning, at any intermediate stage, or at the end as desired.

The fibrous webs may be formed in any suitable manner such as by carding, garnetting, or by dry deposition from an air suspension of the fibers. The thin web or fleece obtained from a single card may be treated in accordance with the present invention, but generally it is necessary and desirable to superpose a plurality of such webs to build up the mat to sufficient thickness for the end use intended, particularly in the making of heat insulation. In building up such a mat, alternate layers of carded webs may be disposed with their fiber orientation directions disposed at 60° or 90° angles with respect to intervening layers.

The fibers from which the webs may be made include cellulosic fibers such as cotton, rayon, jute, ramie, and linen; also cellulose esters such as cellulose acetate; silk, wool, casein, and other proteinaceous fibers; polyesters such as poly(ethylene glycol terephthalate); polyamides such as nylon; vinyl resin fibers such as the copolymer of vinyl chloride and vinyl acetate, polymers of acrylonitrile containing 70% to 95% by weight of acrylonitrile including those available under the trademarks Orlon and Acrilan; and siliceous fibers such as glass and mineral wools.

The aqueous dispersion of the water-insoluble copolymer of the present invention may be applied to the web or mat of fibers in any suitable fashion such as by spraying, dipping, roll-transfer, or the like. The concentration may be from 5% to 60% by weight, and preferably from 5% to 25%, at the time of application as an aqueous dispersion.

The binder dispersion may be applied to the dry fibers after the formation or deposition of the web or mat so as to penetrate partially into or completely through the interior of the fibrous products. Alternatively, the binder dispersion may be applied to the fibers as they fall through the settling chamber to their point of deposition. This is advantageously accomplished by spraying the binder dispersion into the settling chamber at some intermediate point between the top and the bottom thereof. By so spraying the fibers as they descend to the point of collection, it is possible to effect a thorough distribution of the binder among the fibers before they are collected into the product. In the production of certain fibrous products wherein a hot molten mass of a polymer, such as nylon or a fused siliceous mass or glass, is disrupted by jets of heated air or steam, the binder dispersion may be sprayed directly on the fibers while still hot and very shortly before their deposition so that quickly after deposition the binder is set to bond the fibers in proper relationship. Preferably, however, application of the binder dispersion to the fibrous product is made at room temperature to facilitate cleaning of the apparatus associated with the application of the binder dispersion. The binder dispersion may be applied to one or both surfaces of the fibrous product or it may be distributed through the interior as well.

The binder of the present invention may be applied in conjunction with other binders, such as glue. Similarly, the use of potentially adhesive fibers within the fibrous product may also be resorted to in conjunction with the use of a binder of the present invention.

If desired, the aqueous dispersion of the polymer and condensate may also contain a wetting agent to assist penetration of the fibrous web or mat to which it is applied, and it may contain either a foaming agent to provide the binder in a foamed condition in the final product or it may contain a defoamer when the ingredients of the aqueous dispersions have a tendency to give rise to foaming and in a particular case such foaming is undesirable. The conventional wetting agents, such as the sodium salt of dioctylsulfosuccinic acid may be used and the conventional foaming and defoaming agents may be employed, such as sodium soaps, including sodium oleate for foaming and octyl alcohol or certain silicones for defoaming.

An acid catalyst may be included in the aqueous dispersion at the time it is applied to the fibrous web or it may be applied to the fibrous web before or after the copolymer is applied. Examples of acidic catalysts that may be employed include oxalic acid, dichloracetic acid, p-toluenesulfonic acid, and acidic salts such as ammonium sulfate and amine salts, such as the hydrochloride of 2-methyl-2-aminopropanol-1.

The proportion of the polymer that is applied to the web or mat is such as to provide 15 to 50% (or, in some cases, even up to 75%) by weight of copolymer based on the total weight of copolymer and fibers. After application of the aqueous dispersion of the water-insoluble copolymer to the fibrous web, the impregnated or saturated web is dried either at room temperature or at elevated temperatures. The web is subjected, either after completion of the drying or as the final portion of the drying stage itself, to a baking or curing operation which may be effected at a temperature of about 210° to about 750° F. for a period which may range from about one-half hour at the lower temperatures to as low as five seconds at the upper temperatures. The conditions of baking and curing are controlled so that no appreciable deterioration or degradation of the fibers or copolymer occurs. Preferably, the curing is effected at a temperature of 250° to 325° F. for a period of 2 to 10 minutes.

It is believed that the curing operation in some way causes reaction of the polymer molecules to effect cross-linking thereof to a condition in which the binder is highly resistant to laundering and drycleaning. This reaction involves the N-methylol groups of some polymer molecules with the reactive hydrogen-containing groups of others of the polymer molecules. It is also believed that the curing causes some reaction between the N-methylol groups of the polymer molecules and reactive groups in the fibers such as the hydroxyl groups of the cellulose fibers. Also, presence of the polyalkylene glycol in binder of the present invention appears to reduce or prevent migration of emulsion polymer particles resulting in greatly improved uniformity of distribution of binder in the bonded web. Consequently resilience and solvent-resistant properties are not adversely affected by irregularity of distribution of the binder.

The bonded fibrous products of the present invention are characterized by resilience, softness, flexibility, resistance to discoloration, resistance to chlorinated hydrocarbon dry-cleaning fluids, and resistance to laundering. Because of the softness and flexibility and good draping qualities of the products of the present invention, they are particularly well-adapted for use in garments where porosity, especially to moisture vapor, and soft hand and feel, make the products advantageous where contact with the skin of a wearer may be involved. In general, the products are quite stable dimensionally and have good resilience and shape-retention properties. They are adapted for use not only in garments but as padding or cushioning, and in moisture-absorbing articles, such as bibs and diapers. They are also useful as heat- and sound-insulating materials and as filtration media, both for liquids and gases. They can be laminated with paper, textile fabrics, or leather to modify one or both surfaces of the latter materials. They may be adhered to films of cellophane, polyethylene, saran, polyethylene glycol terephthalate (Mylar) or metallic foils, such as of aluminum, to improve the tear strength of such films and foils, to make the latter more amenable to stitching, and to modify other characteristics including strength, toughness, stiffness, appearance, and handle.

As stated hereinabove, the products obtained from non-woven fibrous webs employing the aqueous dispersion of the composition of the present invention impart good resistance to laundering and drycleaning when applied as the sole binder and cured in the manner stated hereinabove. Such products are also free of any tendency to become discolored on chlorination and ironing. However, for some purposes, particularly when chlorination and/or ironing are not encountered, the composition of the present invention may be employed in conjunction with a thermosetting resin condensate, such as an aminoplast or polyepoxide. The amount of such condensate that may be included in the binder compositions may be as high as 20% by weight of the copolymer, a proportion of 3% to 10% being preferred when such condensate is used.

The aminoplast condensates which may be employed are the low molecular weight or monomeric reaction products of formaldehyde with urea, thiourea, biuret, or other homologs or derivatives thereof, such as N,N-ethyleneurea, N,N'-dimethylurea, N,N'-diethylurea, N,N'-dimethoxymethylurea, N,N-dimethoxymethylurea, N,N'-diethoxyethylurea, tetramethoxymethylurea, and tetraethoxyethylurea. Similar reaction products of formaldehyde with triazines, such as melamine may also be employed, such as N,N-dimethylmelamine and alcohol-modified melamineformaldehyde thermosetting resin condensates, e.g. of methyl and ethyl alcohols, for example, dimethoxymethyl-monomethylolmelamine. Preferably, the extent of condensation of these resin-forming aminoplast condensates is such that they are still soluble in water or self-dispersible therein to a colloidal condition.

The epoxy thermosetting resin-forming condensates may be either ether-soluble or self-dispersible in water. The water-soluble types may be any of those having the Formulas III, IV, V, and VI:

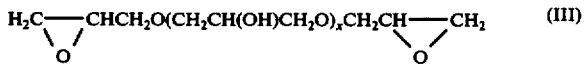

where x is a number having an average value of 1 to 3;

where y is a number having an average value of 2 to 4; and

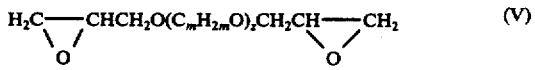

where m is an integer having a value of 2 to 4, and z is a number having an average value of 1 to 5.

The water-insoluble but self-dispersible condensates containing epoxide groups include the compounds of Formula IV above wherein y has an average value of 5 to 10 and also compounds of Formula VI:

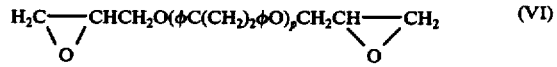

where $\phi$ is the p-phenylene group, and p is a number having an average value of 1 to 3.

While the binder may be preferentially applied, if desired, to portions of the fibrous product, such as one or both of the faces thereof, it is characteristic of the binder of the present invention that, if such preferential treatment is not desired, substantially uniform distribution may be obtained because of the reduced tendency of the binder after initial distribution throughout the body of the fibrous product to migrate to the surfaces thereof during drying. As pointed out above, it is thought that this reduced tendency of the binder to migrate is due to the presence of the polyalkylene glycol component.

In the examples, parts and percentages are by weight unless otherwise indicated.

EXAMPLE A

Fibrous webs are formed by cross laying polyester fibers, 1.5 denier and 1.5 inches in length. The webs, weighing from 1 ounce to 2 ounces per square yard are placed between two screens of open mesh glass cloth and are dipped into shallow baths of an aqueous dispersion containing 10% by weight of an emulsion copolymer of 96.5 parts ethyl acrylate and 3.5 parts N-methylolacrylamide and containing 4.3 percent of a sodium dodecyl benzene sulfonate emulsifier and prepared by emulsion copolymerization. The bath is prepared by admixing in an aqueous medium 143 parts of a 35% solids dispersion of the copolymer, 1.5 parts of a mixture of 60% di-capryl sodium sulfosuccinate, 20% isopropanol and 20% water, 5.0 parts ammonium nitrate and 347.0 parts water, and diluting to 10% solids. The supported webs are floated and allowed to wet thoroughly and are then submerged and rolled while beneath the surface of the bath to insure complete wetting and to insure displacement of air which may be trapped among the fibers. The wet web while still supported on the screens is passed between squeeze rolls to remove excess dispersion and is partially dried in infra-red heat to a condition where the wet fibrous web is strong enough to support itself and can be removed from the glass screens. The web is dried in circulating air and cured for 5 minutes at 300° F. The webs are finally conditioned for a minimum of 24 hours at 72° F. and 65% relative humidity.

The resulting fabric web has weak areas and imperfections. Visual observation of the padding operation on fabric webs prepared as above, indicates that during the drying operation, the polymer dispersions tend to migrate to the surface of the webs causing non uniform distribution and weak areas and imperfections in the final web. This observation is affirmed by determining migration by staining the polyester fiber webs with Sevron Brilliant Red 4G, a dye which stains the polymer but not the polyester fiber. The stained webs are then observed in a low power, 30 magnifications microscope and the distribution of the polymer assessed. Poor polymer distribution, caused by poor migration control, is indicated by polymer concentration at the surfaces of the web while the interior — as seen on edges and cut sections — is starved of polymer. Additionally the webs show random areas of polymer concentration and other areas free of polymer. This example shows a fibrous product which is not of the present invention. A comparison between this example and the following examples illustrates the criticality of the polyalkylene glycol component in the compositions of the present invention.

In this and the following examples, migration control is determined by this preceding described method. Resilience where indicated in the following examples also reflects distribution of the polymer since areas which have little or no binder are dead spots which do not recover. Resilience and stiffness are determined by the apparatus and process of Kelley, Alexander and Sioma described in their U.S. Pat. No. 3,620,071. Generally this process comprises subjecting the fabric specimen to a longitudinal tensile load, twisting the specimen through an angle of rotation by applying a releasable torque load around the longitudinal axis of the specimem while retaining one end of the specimen in a fixed position, and releasing the specimen from the applied torque to cause the specimen to oscillate around its axis of rotation and measuring the tensile load required and time for an initial complete oscillation at an applied tensile load at which $A_1/A_2$ is between 2.5 and 3.5, preferably 2.7, $A_1$ and $A_2$ being respectively the amplitude of a first and second oscillation peak. In the examples of this specification, the load that causes oscillation at which $$\frac{A_1}{A_2} \approx 2.7$$

is determined by increasing tensile loads in 5 gram increments up to 25 and in 25 gram increments thereabove. As per the Kelley, Alexander and Sioma invention the minimum tensile load required to give this oscillation and the period of oscillation at this load are relatable to resilience and stiffness respectively of a fabric specimen. The resilience is inversely proportional to the tensile load and the period is relatable to stiffness by the expression ethylene for 15 minutes, the higher the value, the more solvent-resistant the fabric.

Table 2

| Example | Glycol | Mole Weight (Range) | Relative Migration Control | Resilience | Stiffness | Solvent Resistance |
|---|---|---|---|---|---|---|
| A | None | | poor | 25 | 17–23 | 166–183 |
| B | Ethylene Glycol | 62 | poor | 40 | 28 | 187–244 |
| 1 | Polyethylene Glycol | 285–315 | good | 20 | 21–23 | 176–234 |
| 2 | Polyethylene Glycol | 500 | good | 10 | 19–21 | 176–208 |
| 3 | Polyethylene Glycol | 1300–1600 | good | 10 | 19–23 | 171–208 |
| 4 | Polyethylene Glycol | 3000–3700 | fair | 20 | 21–23 | 173–205 |
| C | Polyethylene Glycol | 15,000 | poor | 20 | 19–21 | 135–170 |

$$\text{stiffness} = 1/P^2$$

where P is the period required for a complete oscillation in seconds. Resilience and stiffness may then generally be related to tensile load and period as follows:

Table 1

Resilience

| Tensile Load | Resilience |
|---|---|
| 1 – 30 grams | fast recovery |
| 20 – 100 grams | medium recovery |
| > 100 grams | slow recovery |

Stiffness

| Tensile Load Range | $1/P^2$ | Stiffness |
|---|---|---|
| 5 grams | 1 – 15 | soft |
| 5 grams | 15 – 30 | medium |
| 5 grams | > 30 | stiff |
| 200 grams | 1 – 25 | soft |
| 200 grams | 25 – 40 | medium |
| 200 grams | > 30 | stiff |

Solvent resistance is determined by soaking the bonded fabric in a perchloroethylene dry cleaning solvent for a period of 15 minutes. The tensile strength of the wetted fabric is then measured. The solvent resistance is then reported as ounces per inch of width tensile strength.

EXAMPLES B, C AND 1 TO 4

In these examples, the procedure of Example A is repeated. In these examples, however, except for Example C, 2.5 parts of ethylene glycol or of an aqueous 25% solution of polyethylene glycol is added to the bath before impregnation of the web. In Example C, 6.2 parts of an aqueous 10% polyethylene glycol solution is added. Properties of the resulting fibrous webs are shown in Table 2.

Under the heading "Resilience" in this and the following tables, the numerical value is the load in grams required to make $$\frac{A_1}{A_2} \leqq 2.7$$

and the lower the value, the greater the resilience; the numerical values under "stiffness" are those obtained by substituting the time in seconds of a complete oscillation for P in the relationship $1/P^2$, the higher the values, the greater the stiffness; and the values given under the heading "Solvent Resistance" are the tensile strengths in oz./in. width of the fabric after soaking in perchloro- Examples 1 through 4 illustrate compositions of the present invention. A comparison of Examples A, B, C and 1 to 4 illustrate the critical nature of the polyalkylene glycol component of the present invention as it is defined.

EXAMPLES 5 TO 8

The procedure of Example 2 is repeated using varying proportions of the polyethylene glycol of Example 2. The results obtained are shown in Table 3.

Table 3

| Ex. | Weight Percent of Polyethylene Glycol Based on Weight of Dry Copolymer | Migration Control | Resilience | Stiffness |
|---|---|---|---|---|
| 5 | 1.25 | good | 5 | 23–28 |
| 6 | 2.50 | very good | 5–10 | 21–25 |
| 7 | 3.75 | very good | 5 | 23–25 |
| 8 | 5.00 | excellent | 5 | 23–28 |

These examples illustrate compositions of the present invention using various amounts of polyethylene glycol component.

EXAMPLES 9 TO 12

In these examples fibrous webs are formed by cross-laying polyester fibers, 1.5 denier and 1.5 inches in length. The webs are placed between two screens of open mesh glass cloth and are dipped into shallow baths of an aqueous dispersion containing 10% by weight of an emulsion copolymer of a high molecular weight (about 1 million) having various proportions of ethyl acrylate and N-methylolacrylamide and containing 4.3% of the sodium salt of dodecyl benzene sulfonate as an emulsifier. The baths are prepared by admixing in an aqueous medium 143 parts of a 35% solids dispersion of the copolymer, 2.5 parts of a 25% solids solution of a polyethylene glycol of 300 molecular weight, 1.5 parts of a mixture of 60% di-capryl sodium sulfosuccinate, 20% isopropanol and 20% water, 0.5 parts ammonium nitrate and 347.0 parts water, and diluting to 10% solids. The webs are padded, cured and conditioned per the procedure of Example A. Properties of the fabric webs produced are given in Table 4.

Table 4

| | Amount of Methylol Acrylamide - Percent Based on the Polymer | Properties of Bonded Fabrics | | |
|---|---|---|---|---|
| Ex. | | Resilience | Stiffness | Solvent Resistance |
| 9 | 1.0 | 25 | 15 | 70 |
| 10 | 2.5 | 50 | 18 | 200 |
| 11 | 3.5 | 5 | 20 | 250 |

Table 4-continued

| Ex. | Amount of Methylol Acrylamide - Percent Based on the Polymer | Properties of Bonded Fabrics | | |
|---|---|---|---|---|
| | | Resilience | Stiffness | Solvent Resistance |
| 12 | 4.5 | 25 | 30 | 300 |

These examples indicate compositions of the present invention containing various proportions of the N-methylolamide component.

EXAMPLES 13 TO 15

The procedure of Example 1 is repeated using webs of rayon fibers, nylon fibers and webs of a blend of 1 part viscose rayon, 1 part acetate and 1 part nylon. Results similar to those of Example 1 are obtained.

EXAMPLES 16 AND 17

The one-million molecular weight ethyl acrylate polymers demonstrated in Examples 9 to 12 impart a high degree of solvent resistance with adequate resilience as indicated in Table 4. A polymer of composition similar to those of Examples 9 to 12 and produced by a procedure analogous to that of those preceding examples but altered to produce a polymer of lower molecular weight is compared to a polymer of higher molecular weight in Table 5.

Table 5

| Ex. | Amount of Methylol Acrylamide Percent Based On Polymer | MW of Ethyl-acrylate Polymer | Properties of Bonded Fabric | | |
|---|---|---|---|---|---|
| | | | Resilience | Stiffness | Solvent Resistance |
| 16 | 3.5 | $1 \times 10^6$ | 10 | 20 | 250 |
| 17 | 4.0 | $4 \times 10^5$ | 25 | 18 | 118 |

The preceding and other runs indicate that the preferred molecular weight of the ethyl acrylate N-methylolacrylamide copolymer is at about 1 million. Higher molecular weight copolymers produce improved bonded fabrics but the improvements are generally small.

EXAMPLES 18 TO 22

In these examples, the procedure of Example A is repeated. Fibrous webs are formed by crosslaying polyester fibers, 1.5 denier and 1.5 inches in length and submerging the webs in a bath prepared as in Example A. In these examples, however, the emulsion copolymer is prepared by emulsion copolymerization of 3.5 parts N-methylolacrylamide and the amount of ethyl acrylate and itaconic acid indicated in Table 6 as Examples 18 to 22. Properties of the resulting fibrous webs are shown in Table 6.

These examples show the increase in stiffness in the bonded fabric with increased amount of itaconic acid in the bonding copolymer. It can be seen from these examples that any desired stiffness can easily be incorporated into a bonded non-woven fabric by controlling the proportion of itaconic acid in the emulsion copolymer.

Table 6

| Example | IA % | EA % | Properties of Bonded Fabrics | | |
|---|---|---|---|---|---|
| | | | Resilience | Stiffness | Solvent Resistance |
| 18 | 0.00 | 96.50 | 5 | 20 | 250 + |
| 19 | 0.25 | 96.25 | 5 | 25 | 250 + |
| 20 | 0.50 | 96.00 | 5 | 28 | 250 + |
| 21 | 0.75 | 95.75 | 5 | 32 | 250 + |
| 22 | 1.00 | 95.50 | 5 | 39 | 25- + |

EXAMPLE 23

The procedure of Example 3 is repeated except that (1) emulsion copolymers are used of the following compositions:

a. 48% of ethyl acrylate, 4% of butyl acrylate, 3.5% of N-methylolacrylamide, and 0.5% of itaconic acid, b. 25% methyl acrylate, 71% butyl acrylate, 3% N-methylolmethacrylamide and 1.0% methacrylic acid, and c. 75% ethyl acylate, 22% 2-ethylhexyl acrylate, and 3.0% of N-methylolacrylamide.

EXAMPLE 24

The procedures of Example 23 (a), (b), and (c) are repeated except that the amount of the polyethylene glycol is raised to 4%, based on the weight of the copolymer.

I claim:

1. A process of making a non-woven fabric which comprises associating in random array, within a web or mat, a mass of fibers, bringing into contact with the fibers a binder comprising an aqueous dispersion of the mixture of
   1. a water-insoluble emulsion compolymer consisting essentially of 1 to 8% by weight of an N-methylolamide selected from N-methylolacrylamide or N-methylolmethacrylamide, and for the balance to make 100%, at least one ester of acrylic acid or methacrylic acid and a $C_1$ to $C_{18}$ alkanol and 0.5 to about 5% by weight, based on the copolymer weight, of an unsaturated aliphatic carboxylic acid having 3 to 6 carbon atoms and
   2. about 0.5 to about 10% by weight, based on the weight of the copolymer of a polyalkylene glycol of the formula

$$HO-(RO)_n-H$$

wherein R is an alkylene group of 2 to 6 carbon atoms and n is a number having an average value of 4 to 50, drying the resulting fibrous mass to effect fusion of the polymer and bonding of the fibers, and then heating the fibrous product at a temperature of 210° F. to 750° F. to produce a soft, resillient non-woven fibrous product of excellent solvent resistant properties.

2. The process of claim 1 in which the binder comprises (1) a copolymer of 3 to 4.5% by weight of the N-methylolamide, 95.5 to 97% by weight of the acrylic acid ester, and 0.5 to 5.0% by weight of itaconic acid and (2) 2 to 5% by weight of the polyalkylene glycol.

* * * * *